(12) United States Patent
Phatak (10) Patent No.: US 9,652,792 B1
(45) Date of Patent: May 16, 2017

(54) DYNAMICALLY GENERATING RESOURCE TRACKING CODES

(71) Applicant: Audible, Inc., Newark, NJ (US)

(72) Inventor: Aniket Vinay Phatak, Jersey City, NJ (US)

(73) Assignee: Audible, Inc., Newark, NJ (US)

( * ) Notice: Subject to any disclaimer, the term of this patent is extended or adjusted under 35 U.S.C. 154(b) by 786 days.

(21) Appl. No.: 14/089,331

(22) Filed: Nov. 25, 2013

(51) Int. Cl.
*G06F 15/16* (2006.01)
*G06Q 30/06* (2012.01)

(52) U.S. Cl.
CPC .............................. *G06Q 30/0601* (2013.01)

(58) Field of Classification Search
USPC .......................... 709/203, 200, 224, 229, 226
See application file for complete search history.

(56) References Cited

U.S. PATENT DOCUMENTS

| | | | | |
|---|---|---|---|---|
| 2008/0052278 A1* | 2/2008 | Zlotin | ..................... | G06Q 30/02 |
| 2011/0258049 A1* | 10/2011 | Ramer | .............. | G06F 17/30867 705/14.66 |
| 2013/0024847 A1* | 1/2013 | Browne | .............. | G06F 11/3692 717/131 |

OTHER PUBLICATIONS

Google Analytics, 'URL Builder', https://support.google.com/analytics/answer/1033867?rd=1, available at least as early as Oct. 9, 2013.
U.S. Appl. No. 12/782,613, filed May 18, 2010.

* cited by examiner

*Primary Examiner* — El Hadji Sall
(74) *Attorney, Agent, or Firm* — Knobbe, Martens, Olson & Bear, LLP (57) ABSTRACT

Systems and methods are provided for generating a tracking code that may be included in an identifier, such as an identifier identifying a network resource or network location, in order to track various information associated with the identifier upon user selection of the identifier. For example, a tracking code may be dynamically generated and appended to an identifier associated with one or more selectable options in a user interface. The tracking code may, for example, identify the section or portion within the user interface that the selectable option is included and/or other information. When a user selects such a selectable option in the user interface, information included in the tracking code may be stored and/or analyzed to determine effectiveness or performance of various selectable options.

20 Claims, 6 Drawing Sheets

Search Top Tracking Codes

Search prefixes: a_

Filter by regular expression: (.*)_projectX

Timespan: Last 7 Days (Change)

Refresh

Analytics Data
First discovery attribution model (Change)

| Tracking Codes | Total Hits | Cart Adds | Purchased Units | % of site-wide cart adds |
|---|---|---|---|---|
| All Domains | 737,566 | 49,553 | 1,228 | 4.15% |
| U.S. Domain (315) | 19,691 | 47 | 9 | .09% |
| a_signin_anon-h_all_projectx | 9,923 | 25 | 4 | .04% |
| a_homepage_pd_2_projectx | 2,144 | 13 | 1 | 0% |
| a_search_tseft_projectx | 2,054 | 2 | 0 | 0% |
| a_homepage_1_1_projectx | 1,099 | 0 | 0 | 0% |
| a_mn_anon-h_tloft_projectx | 560 | | | |
| Showing Top 5 of 315 codes. See more | | | | |
| German Domain (27) | 27 | 3 | 0 | 0% |
| U.K. Domain (18) | 18 | 1 | 0 | 0% |

*Fig.6.*

DYNAMICALLY GENERATING RESOURCE TRACKING CODES

BACKGROUND

Electronic commerce is a popular way of selling items (e.g., goods and/or services) to consumers. A typical electronic commerce system may provide user interfaces that enable consumers to browse and/or purchase items from a merchant or seller associated with the electronic commerce system. For example, an electronic catalog may include hundreds or thousands of items, with each item having a given network page describing the particular item. Users may browse listings of items that include selectable options to view the respective item's network page. Similarly, various pages or user interfaces associated with the electronic commerce system may include options recommending one or more items to a user or identifying popular items in the electronic catalog.

Business operators and/or developers associated with maintaining electronic commerce systems often experiment with different page layouts, recommendation algorithms and/or other methods of determining items to present to a user in particular page locations. Some system operators that desire to track a user's selection of a selectable option may include a tracking string or tracking code associated with a given selectable option within a uniform resource identifier ("URI") associated with the option. Such tracking strings or codes are commonly hard-coded as part of a static URI, such that making any changes to the tracking information would include editing code associated with the page or user interface in which the selectable option and associated URI are included.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 6 is an illustrative user interface generated at least in part by a tracking management server that includes tracking analytics information associated with tracking codes generated by the tracking management server.

DETAILED DESCRIPTION

Generally described, aspects of the present disclosure relate to generating a tracking code that may be included in an identifier, such as a uniform resource identifier ("URI") identifying a network resource or network location, in order to track various information associated with the identifier upon user selection of the identifier. For example, according to some embodiments, when a user interface or page is generated, one or more component modules, as described herein, may select content to present in the user interface. The content may include selectable text and/or images that are associated with an underlying URI, whereby a user selection of the selectable option may result in an electronic request being sent for the underlying URI, such as by a browser requesting a network resource identified by the URI. In some embodiments, for at least one URI that may be selected by a user viewing the user interface, a tracking code or string may be dynamically generated and appended to the end of the URI by a tracking module, as disclosed herein. The tracking code may, depending on the embodiment, identify the section or portion within the user interface in which the selectable option is included and/or identify other information regarding the option's specific location within the user interface. The tracking code may additionally or alternatively include information regarding a component or feature that selected the given URI for inclusion in the user interface and/or other information described herein.

According to some embodiments, if a user requests to view content associated with a given identifier by selecting an associated selectable option within a user interface, a tracking module stored in memory of, and implemented by, a computing device, as disclosed herein, may store tracking data in a data store indicating that an option with the given tracking code was selected. Subsequently, future selections, purchases or other actions by the user may also be stored and associated with the given tracking code in the data store, according to some embodiments. Based on the stored data, the tracking module may enable an administrator, system operator, product manager or other individual to review analytics data indicating the performance of various tracking codes in a human-readable form. The analytics data may be used, for example, to determine features or components that are effective at selecting content of interest to users, to determine specific pages (and locations within those pages) in which a selectable option is most likely to be selected by a user and/or to determine other information discussed below.

In some embodiments, an electronic catalog system, as described herein, may include or be in communication with a data store of information about items that may be listed for sale by sellers, merchants and/or other users. The item information in this database may be viewable by end users through a browsable electronic catalog in which each item may be described in association with a corresponding item detail page. Each item detail page may include, for example, an item image and description, customer ratings, customer and professional reviews, sales rank data, lists of related items, and/or other types of supplemental data that may assist consumers in making informed purchase decisions. Users of the system may, in some embodiments, locate specific item detail pages within the electronic catalog by executing search queries, navigating a browse tree and/or using various other navigation techniques.

An identifier in which a tracking code is included may be, for example, a text string, a URI or other data that can be interpreted by a browser or other program operating on a computing device in order to present the identified content, request the identified content from a server or other system, or the like. While a retail environment is often used as an example below, it will be appreciated that tracking codes, as disclosed herein, may be used in a variety of environments other than a retail environment. For example, aspects of the present disclosure, in some embodiments, may be used or implemented to track the performance of any selectable content that may be identified with a URI or other identifier within any user interface, page, video, electronic book and/or other electronic content. For illustrative purposes, selectable options are often described below in the context of items listed in an electronic catalog. Alternatively, in other embodiments, selectable options that may be tracked according to the systems and methods described herein may include advertisements, news articles, editorial content, images, videos, books, classified listings, auction listings and/or any other content that may be electronically presented to a user.

Figure 1:
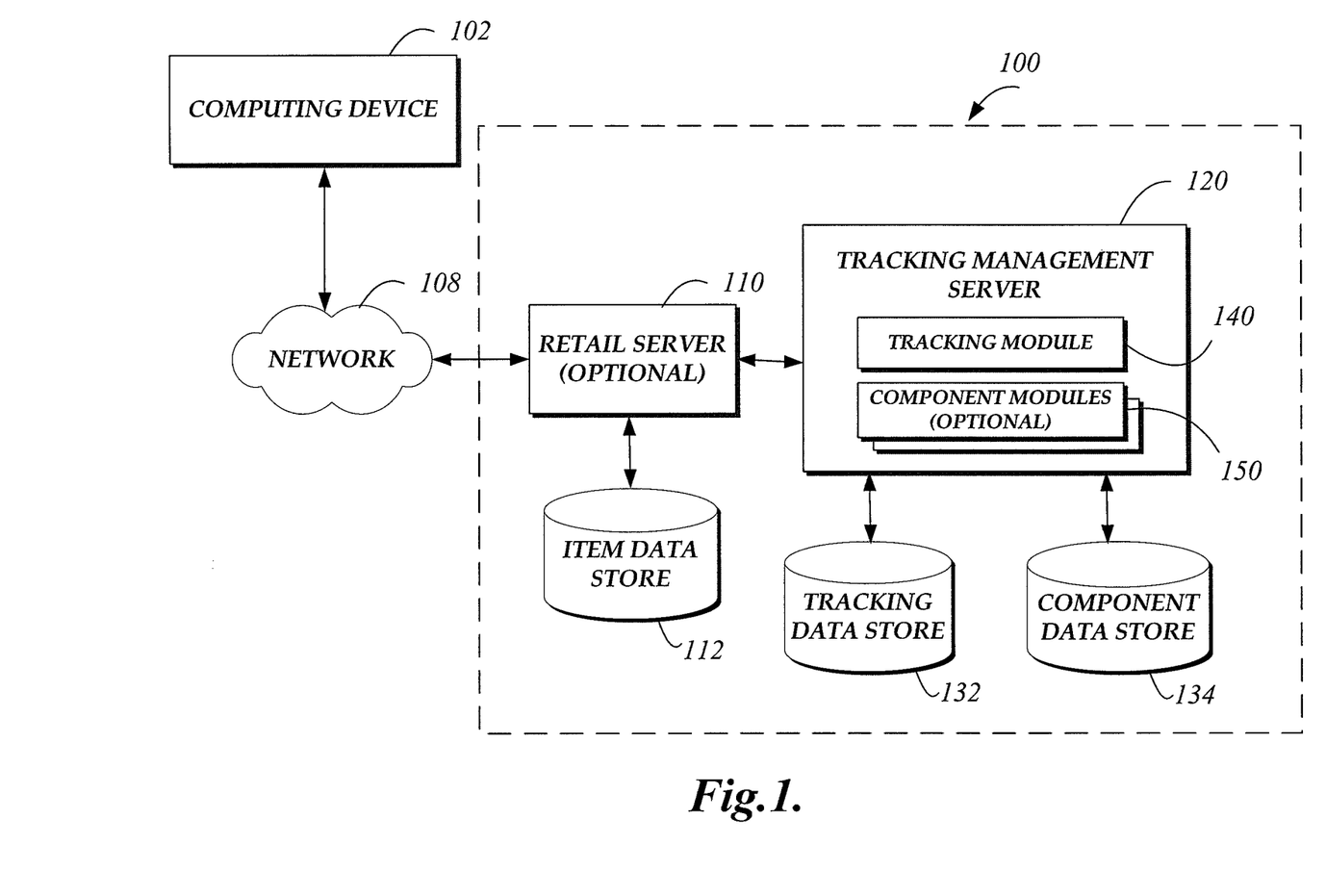
FIG. 1 is a block diagram depicting an illustrative operating environment for presenting selectable options associated with dynamically generated tracking codes.

The illustrative operating environment shown in FIG. 1 includes an electronic marketplace system 100 that enables users to browse and place orders for items (such as items listed in an electronic catalog). The marketplace system 100 may include one or more tracking management servers 120 that include a tracking module 140 stored in memory therein that may be used to implement various aspects of the present disclosure, such as generating tracking codes, analyzing user behavior with respect to identifiers associated with tracking codes and other aspects discussed herein. The tracking management server 120 may also include, in some embodiments, one or more component modules 150 that may select items and/or content to include in various portions of a user interface. For example, each of a number of component modules 150 may implement a different selection method for selecting items to display to a user, such as by determining recommended items, identifying the most popular items in an electronic catalog, selecting items similar to or related to another item and/or other selection methods. The marketplace system 100 may also include one or more retail servers 110 that facilitate electronic browsing and purchasing of items, such as goods and/or services, using various user devices, such as user computing device 102. Those skilled in the art will recognize that the user computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, tablet computer, gaming console or controller, kiosk, augmented reality device and the like.

The tracking management server 120, which will be described below in more detail, may be connected to or in communication with a component data store 134 that may include a number of components, where a "component" may be a code module or service capable of producing content that may be placed in a portion of a user interface or displayable file. For example, a component selected for inclusion in a portion of a page, displayable file or user interface, may dynamically generate content that contains links, buttons or other controls for allowing users to perform specific actions, such as adding a displayed item to a shopping cart. The retail server 110 may be connected to or in communication with an item data store 112 that stores item information regarding a number of items, such as items listed in an electronic catalog as available for browse and/or purchase via the retail server 110. Item data stored in item data store 112 may include any information related to each item. For example, item data may include, but is not limited to, price, availability, title, item identifier, item image, item description, item attributes, keywords associated with the item, etc. In some embodiments, the item data store 112 may store digital content items (e.g., audiobooks, electronic books, music, movies, multimedia works, etc.). The retail server 110 may also be connected to or in communication with a user data store (not illustrated) that stores user data associated with users of retail server 110, such as purchase history, browsing history, item reviews and ratings, personal information, user preferences, location information, etc.

In different embodiments, each of item data store 112, tracking data store 132 and/or component data store 134 may be local to tracking management server 120, may be local to retail server 110, may be remote from both tracking management server 120 and retail server 110, and/or may be a network-based service itself. In the environment shown in FIG. 1, a user of the marketplace system 100 may utilize user computing device 102 to communicate with the retail server 110 via a communication network 108, such as the Internet or other communications link. The network 108 may be any wired network, wireless network or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art and, thus, are not described in more detail herein.

The marketplace system 100 is depicted in FIG. 1 as operating in a distributed computing environment comprising several computer systems that are interconnected using one or more computer networks. The marketplace system 100 could also operate within a computing environment having a fewer or greater number of components than are illustrated in FIG. 1. Thus, the depiction of marketplace system 100 in FIG. 1 should be taken as illustrative and not limiting to the present disclosure. For example, the marketplace system 100 could implement various Web services components and/or peer-to-peer network configurations to implement at least a portion of the processes described herein.

In brief, the retail server 110 is generally responsible for providing front-end communication with various user devices, such as user computing device 102, via network 108. The front-end communication provided by the retail server 110 may include generating text and/or graphics, possibly organized as a user interface using hypertext transfer or other protocols in response to information inquiries received from the various user devices. The retail server 110 may obtain information on available goods and services from one or more data stores, such as item data store 112, as is done in conventional electronic commerce systems. In certain embodiments, the retail server 110 may also access item data from other data sources, either internal or external to marketplace system 100. While marketplace system 100 is often described herein with respect to an embodiment in which the tracking management server 120 communicates with a retail server 110 in a retail environment, in other embodiments, a tracking management server 120 may operate independently of a retail environment. In some such embodiments, the tracking management server 120 may communicate with the user computing device 102 without the presence of a retail server, or may communicate with another server responsible for providing front-end communication with the computing device 102. In other embodiments, the retail server 110 may include a tracking module, as described herein, such that a separate tracking management server may not be present in certain embodiments.

Figure 2:
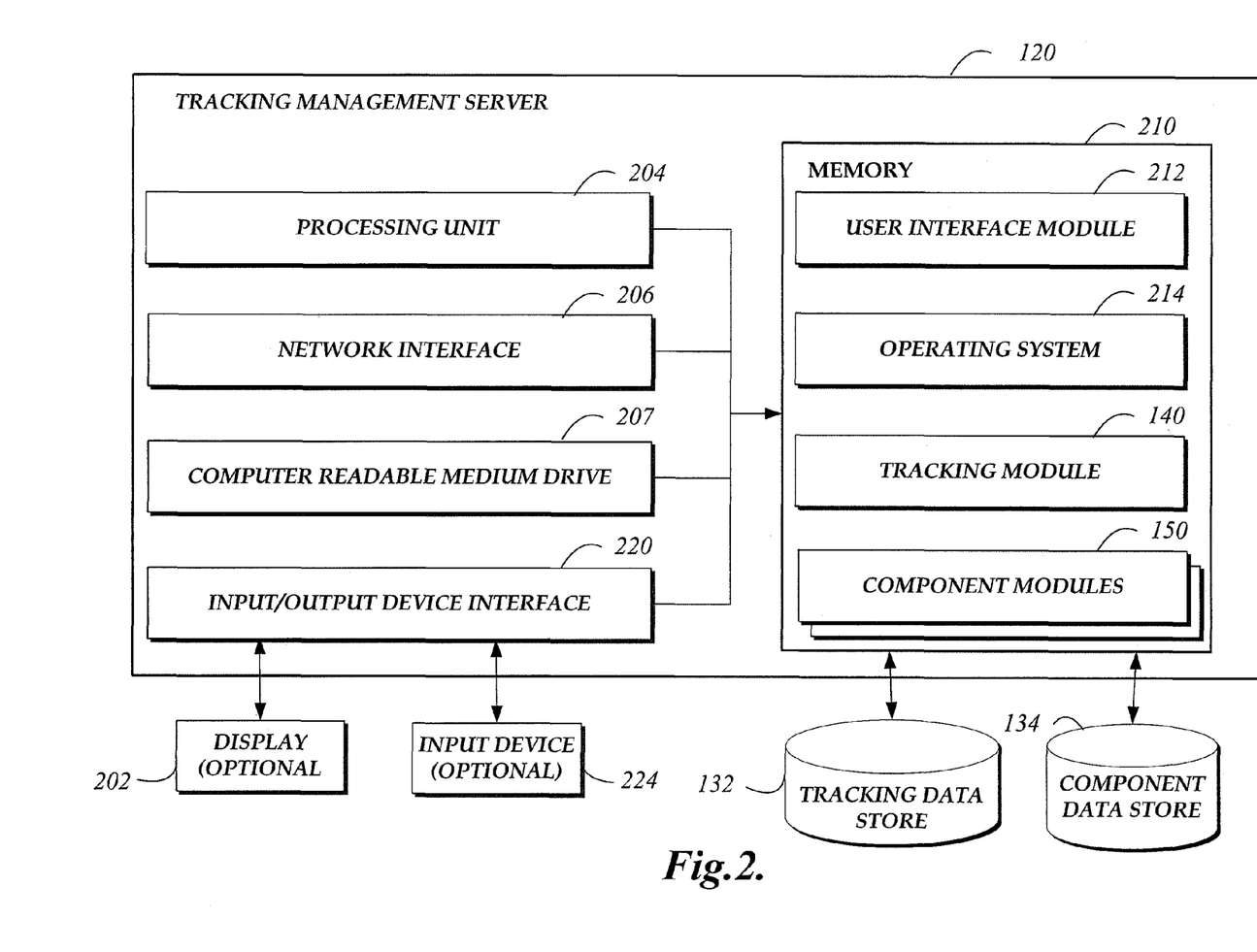
FIG. 2 depicts a general architecture of a computing device (e.g., a tracking management server) for generating tracking codes and managing tracking information.

FIG. 2 depicts a general architecture of a computing device, (e.g., tracking management server 120) that generates tracking codes and manages tracking information. The general architecture of the tracking management server 120 depicted in FIG. 2 includes an arrangement of computer hardware and software components that may be used to implement aspects of the present disclosure. The tracking management server 120 may include many more (or fewer) components than those shown in FIG. 2. It is not necessary, however, that all of these generally conventional components be shown in order to provide an enabling disclosure. As illustrated, the tracking management server 120 includes a network interface 206, a processing unit 204, an input/output device interface 220, a display 202, an input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, microphone, touch screen, etc.

The memory 210 contains computer program instructions (grouped as modules in some embodiments) that the processing unit 204 executes in order to implement one or more embodiments. The memory 210 generally includes RAM, ROM and/or other persistent, auxiliary or non-transitory computer-readable media. The memory 210 may store an operating system 214 that provides computer program instructions for use by the processing unit 204 in the general administration and operation of the tracking management server 120. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a browser installed on the computing device. In addition, memory 210 may include or communicate with an auxiliary tracking data store 132, component data store 134 and/or one or more other data stores, as discussed above with reference to FIG. 1.

In addition to the user interface module 212, the memory 210 may include a tracking module 140 that may be executed by the processing unit 204. In one embodiment, the tracking module 140 implements various aspects of the present disclosure, e.g., generating tracking codes, analyzing user behavior with respect to tracking codes, etc., as described further below. While the tracking module 140 and component modules 150 are shown in FIG. 2 as part of the tracking management server 120, in other embodiments, all or a portion of a tracking module and/or one or more component modules 150 may be a part of the retail server 110 and/or another computing device. For example, in certain embodiments of the present disclosure, the retail server 110 may include several components that operate similarly to the components illustrated as part of the tracking management server 120, including a user interface module, tracking module, one or more component modules, processing unit, computer readable medium drive, etc. In such embodiments, the retail server 110 may communicate with a tracking data store, such as tracking data store 116, and the tracking management server 120 may not be needed in certain embodiments. Further, although certain examples are illustrated herein in the context of a retail server 110, this is not a limitation on the systems and methods described herein.

Figure 3:
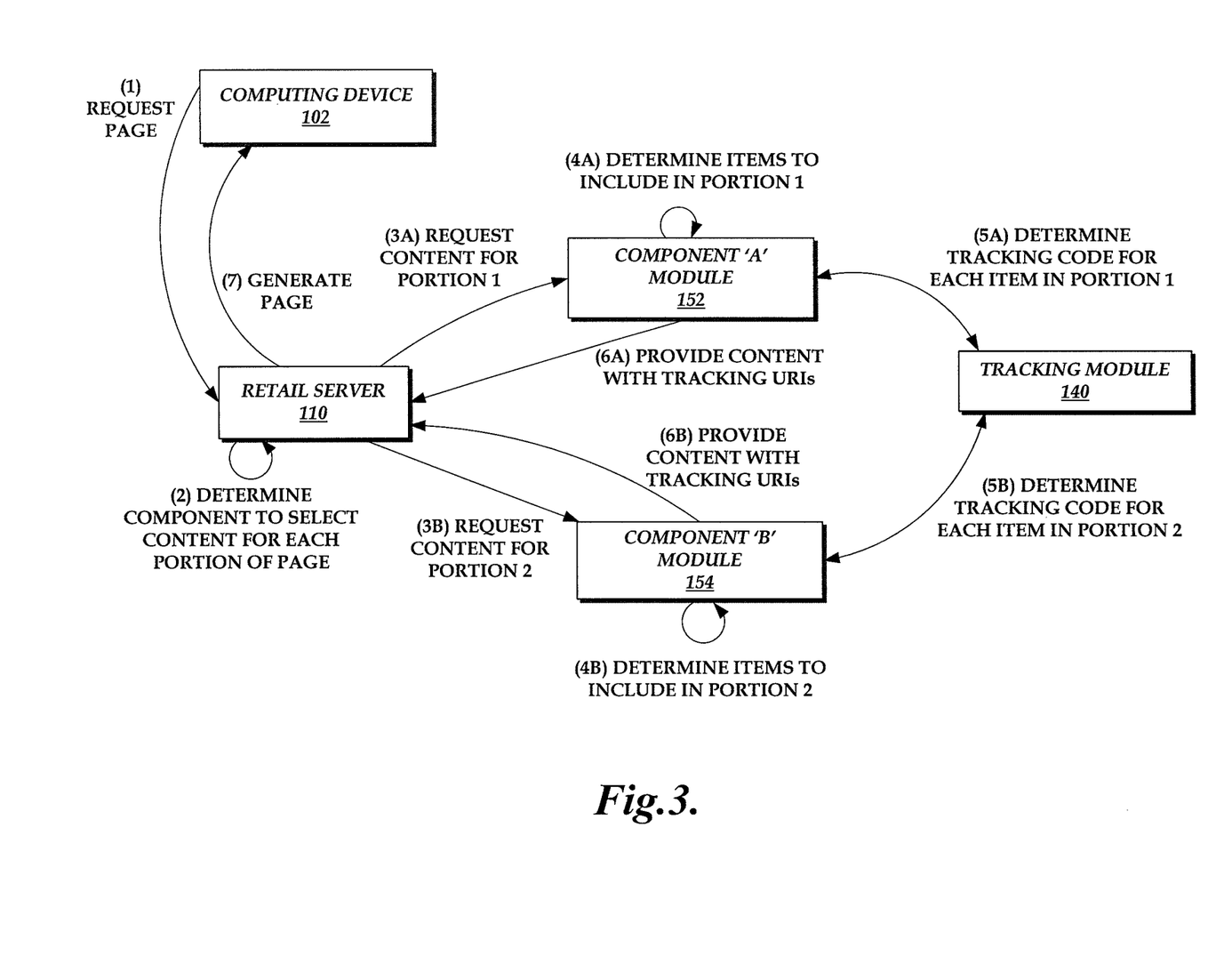
FIG. 3 is a block diagram of an illustrative operating environment in which component modules determine items to include in portions of a page, and a tracking module generates a tracking code for each item.

FIG. 3 is a block diagram of an illustrative operating environment illustrating component modules 152 and 154 determining items to include in portions of a page or user interface, and a tracking module 140 generating a tracking code for each item. While the example of a page will be used below, it will be appreciated that the retail server 110 and/or tracking management server 120 may generate a user interface or a displayable file of various forms, depending on the embodiment. As illustrated, computing device 102 sends a request for a page to retail server 110. The request may be sent, for example, by a browser executed by the computing device 102. Upon receiving the page request, the retail server 110 may determine a component to select content for each portion of the page. For example, the page or user interface to be generated at least in part by the retail server 110 may include various sections or portions. The sections may be visually distinguished (such as appearing as one or more rows or columns, and/or being marked by visual lines or boundaries) or may appear seamlessly or continuously with content of one or more other sections. In some embodiments, one or more of the sections may include dynamic content that is generated by a module, where each section may have a different associated module responsible for generating the content to be included in the given section or portion of the page. In the illustrated example, code of the page may indicate that, when generating the page for display to a user, a request should be made to a first module (illustrated as "Component A" module 152) for content to be shown in a first section of the page, while a request should be made to a second module (illustrated as "Component B" module 154) for content to be shown in a second section of the page. In other embodiments, the retail server 110 may dynamically determine the component to select items for one or more portions of the page based on various considerations, such as the particular user and/or past performance of various components.

Next, the retail server 110 sends a request for content for the first portion of the page to component module 152. The retail server 110 additionally sends a request for content for the second portion of the page to component module 154. While two components are illustrated in FIG. 2, it will be appreciated that, in other embodiments, a single component may select items for multiple portions of the page and/or a number of additional components may select content for additional portions of the page. Depending on the embodiment, component modules 152 and 154 may be a part of retail server 110, a part of tracking management server 120 or a part of one or more other systems not illustrated in FIGS. 1 and 2.

The retail server 110, when requesting content for the page from component modules 152 and 154, may send information to each component module identifying the page, identifying the section or portion of the page for which the given component is to select items, and/or other information. In the illustrated embodiment, component module 152 and component module 154 then each determine one or more items to include in their respective portions of the page. As will be appreciated, items may be selected in many different manners depending on the embodiment and the component making the item selections. As a few examples, a given component may be configured to determine recommended items based on previous browsing or purchasing information, identify the most popular items in an electronic catalog or select items that are similar to another item. Each item selected for inclusion in the page by component module 152 or component module 154 may be associated with an identifier, such as a URI for an item detail page for the given item. The items selected by each component may each be represented in the page by a selectable option, such as text and/or an image identifying the item or otherwise associated with the item. For each item that component module 152 has selected to include in the first portion of the page, the component module 152 sends a request to the tracking module 140 for a tracking code. Similarly, the component module 154 sends a request to the tracking module 140 for a tracking code for each item that component module 154 has selected to include in the second portion of the page.

For example, component module 152 may have selected three items to include in three separate positions within the first portion of the page. For each of the three items, the component module 152 may send, to the tracking module 140, information identifying the page and the portion in which the item will appear (which may have each been provided to the component module 152 by the retail server 110), along with information identifying a position of the given item within the portion (such as, in the given example, information identifying whether the given item will appear first, second or third in the portion). The component module 152 may additionally provide the tracking module 140 with information identifying the component module 152 and/or identifying a method or feature used by the component module 152 in selecting items for inclusion in the page.

For each request, the tracking code module 140 may generate a tracking code based at least in part on the various information provided in the request, such as the page, the portion of the page in which the item will appear, the position of the item within the portion of the page, a component and/or feature associated with the portion and/or other information, as discussed in more detail below. The tracking module 140 provides each generated tracking code to the respective requesting module (in this example, whichever of component module 152 or component module 154 requested the given tracking code). Component module 152 and component module 154 each then append or otherwise adjust the URL or other identifier for each item to include the respective tracking code generated by the tracking module 140, as discussed in more detail below. The component modules 152 and 154 then provide the retail server 110 with the content selected for inclusion in each module's respective portion of the page (which includes a tracking code within the identifier associated with each item's selectable option). In the illustrated embodiment, the retail server 110 generates the page based at least in part on the information provided by the component modules 152 and 154, and then sends the page to the computing device 102 for presentation to the user. In other embodiments, the retail server 110 and component modules 152 and 154 may each provide aspects of the page to the computing device 102, such as by the component module 152 generating the first portion of the page and sending the generated portion to computing device 102 for inclusion in the page.

Figure 4:
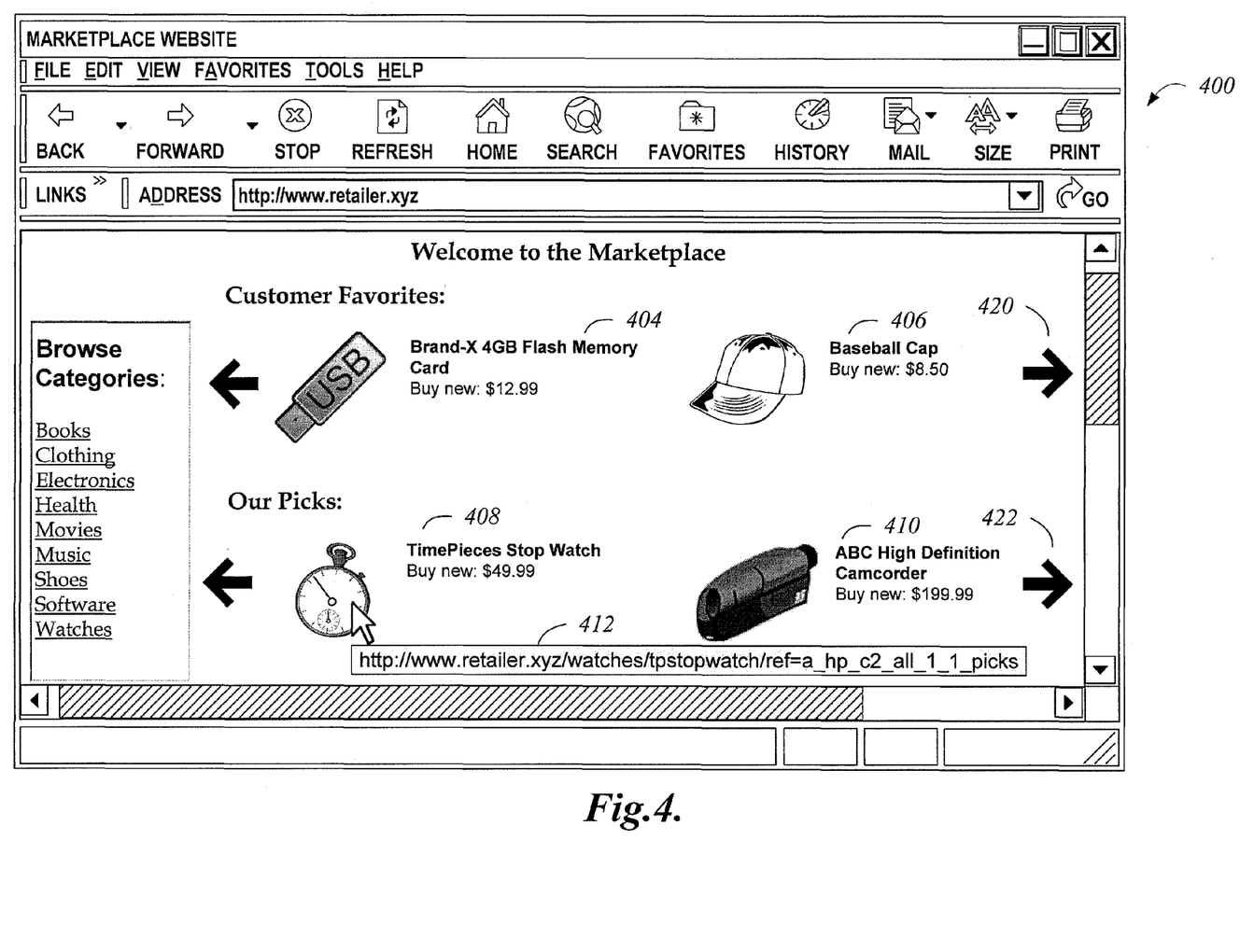
FIG. 4 is an illustrative user interface that includes selectable options associated with a number of items, where a URI associated with each item includes a tracking code generated by a tracking module.

FIG. 4 is an illustrative user interface 400 that includes selectable options associated with a number of items, where a URI associated with each item includes a tracking code generated by the tracking module 140. As shown, the user interface 400 is displayed via a browser operating upon a computing device, such as user computing device 102, utilized by a user. In other embodiments, a user interface similar to user interface 400 may be presented for display outside of a browser context (e.g., within a mobile application). The user interface may have been generated according to the illustrative operating environment discussed above with respect to FIG. 3. For example, the items 404 and 406 may have been selected for inclusion in the "customer favorites" portion of the page by the component module 152. The items 408 and 410 may have been selected for inclusion in the "our picks" portion of the page by the component module 154. The user may select option 420 in order to view additional items selected by the component module 152 or may select option 422 in order to view additional items selected by the component module 154.

As illustrated, a browser operating upon user computing device 102 may be configured to display an underlying URI or other identifier associated with a selectable option on a page when the cursor is placed on or hovers over the selectable option. Accordingly, in illustrative user interface 400, the browser is currently displaying the identifier 412 that will be requested by the computing device 102 if the user selects the selectable option associated with item 408. The identifier 412 reads "http://www.retailer.xyz/watches/tpstopwatch/ref=a_hp_c2_all_1_1_picks." The portion of the identifier 412 that reads "http://www.retailer.xyz/watches/tpstopwatch" may be the identifier for the item detail page of item 412, which the component module 154 may have retrieved from item data store 112. The portion of the identifier 412 that reads "a_hp_c2_all_1_1_picks" may be a tracking code generated by the tracking module 140 and incorporated into the identifier 412 by the component module 154. According to the illustrated embodiment, the tracking code "a_hp_c2_all_1_1_picks" may include sufficient information for the tracking module 140 or an informed individual to later determine various information regarding where the selectable option associated with the tracking code appeared.

For example, the tracking module may parse the illustrated tracking code to determine various information using key-value pairs, a lookup table, a hash function and/or other methods. In the illustrated example, the tracking code may include information identifying a domain (e.g., "a_" may represent the retailer.xyz domain), a page (e.g., "hp_" may represent the homepage), the portion or section of the page (e.g., "c2_" may represent the second portion of the page), an option chosen by a developer associated with the retail server and/or a component module (e.g., "all_" may be a tag added by a developer), the position within the portion of the page (e.g., "1_1_" may represent the first position in the first displayed set of items within the given portion, which may simply be represented by a single digit in other embodiments) and the feature or component responsible for selecting the item (e.g., "picks" may represent that the item was selected for inclusion in the page by a component that selects items based on favorite items of an operator of marketplace system 100).

Figure 5:
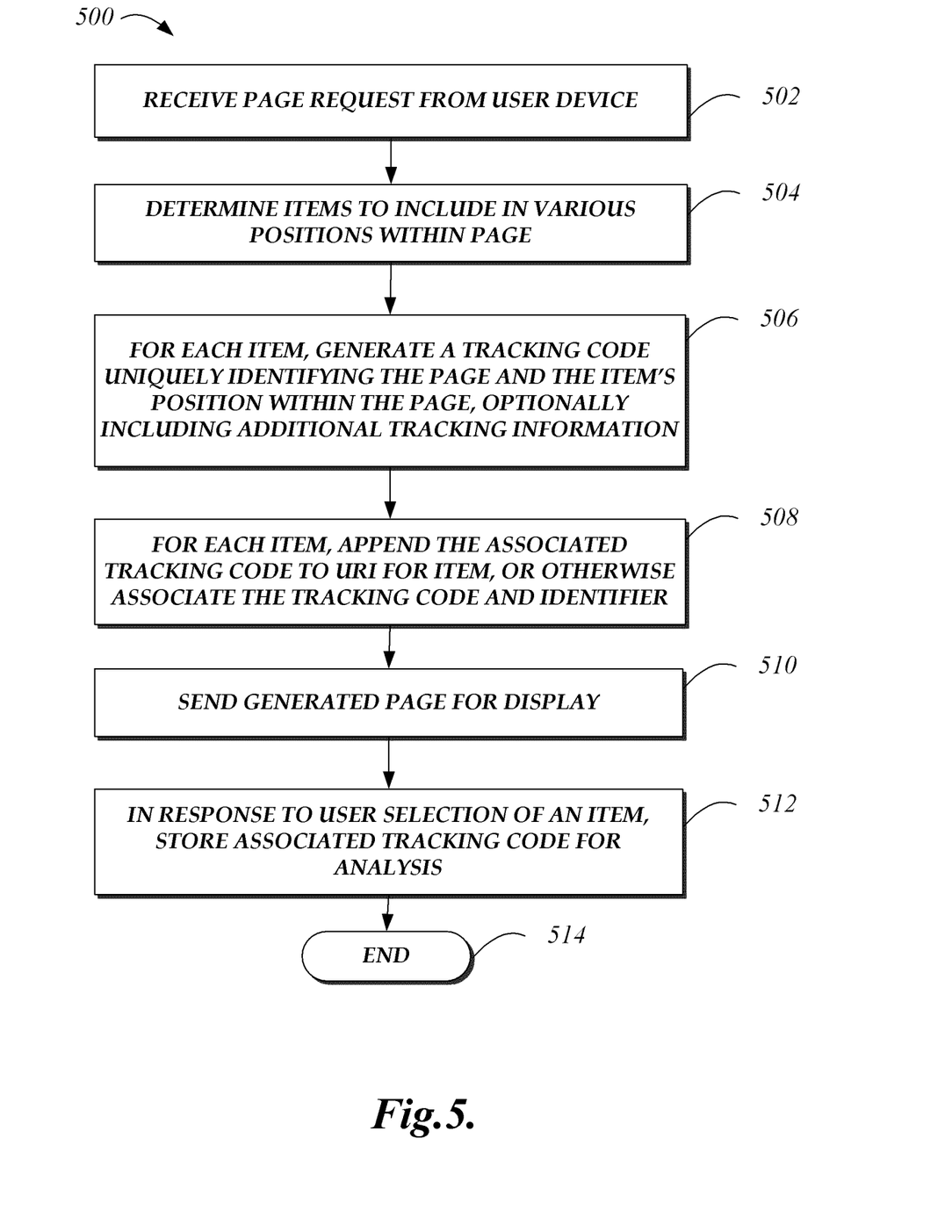
FIG. 5 is a flow diagram of an illustrative method implemented at least in part by a tracking management server for generating a page or user interface that includes tracking codes associated with selectable options or identifiers included in the page or user interface.

FIG. 5 is a flow diagram of an illustrative method 500 implemented at least in part by the tracking management server 120 for generating a page or user interface that includes tracking codes associated with selectable options or identifiers included in the page or user interface. While the illustrative method will be described below as being implemented by the tracking management server 120, in other embodiments, a similar method may be implemented by the retail server 110 or other computing system responsible for providing front-end communication with a user computing device. While a page is used as an example below, the illustrative method 500 may, in other embodiments, include generating a user interface or displayable file other than a page.

The illustrative method 500 begins at block 502, where the tracking management server 120 receives a page request from a user device, such as computing device 102. Alternatively, the tracking management server 120 may receive a request for a page or part of a page to be generated from the retail server 110. In response, at block 504, the tracking management server 120 determines one or more items to include in various positions within the page. For example, as described in more detail above with reference to FIG. 3, one or more component modules 150 may each select one or more items to include as associated selectable options in one or more portions or sections of the page. Alternatively, one or more items may already be statically identified in code associated with the page.

Next, at block 506, the tracking module generates a tracking code for each item selected for inclusion in the page. The tracking code for each item may uniquely identify the page and the item's position within the page, optionally including additional tracking information. A given item's position within the page may be identified in various manners depending on the embodiment, the page layout, stored settings and/or other information. For example, if the page includes multiple rows or sections of content that each includes multiple items, each item's position may be uniquely identified by providing information identifying the section and the position within the section that the given item appears. In other embodiments, the page may include various discrete portions, areas or spaces in which a single item may be included, such that a name or other identification information assigned to the given portion, area or space may be sufficient to uniquely identify an item's position within the page. In other embodiments, an item's position may be identified based at least in part on line numbers, row and/or column numbers, x-y coordinates (e.g., pixel coordinates within the generated page), frame names or numbers, section names or numbers (e.g., "sidebar" representing that the item appeared within a side navigation bar of the page), relative to other content of the page (e.g., information identifying that the item appeared below, above, within, over or between other identified content) and/or based on other information.

In some embodiments, the tracking code may be generated to include additional tracking information associated with the item, the selectable option, the page, a feature or component responsible for selecting the item for inclusion in the page, and/or other information. For example, information identifying a country and/or a domain associated with the page request may be included in the tracking code. The country information or other geographic information included in the tracking code may be used by the tracking module to later determine, from the tracking code, where the page request originated and/or the server that generated the page. In some embodiments, the tracking code may include one or more tags or other information previously selected for inclusion in the tracking code by a developer, administrator, businessperson or other user associated with the retailer server 110 and/or tracking management server 120.

The various information included in the tracking code by the tracking module 140 may be determined based at least in part on information stored in tracking data store 132, received from the retail server 110 and/or received from one or more of the component modules 150. For example, the retail server 110 or a component module may, for each of one or more selectable options included in the page, send a request to the tracking module for a tracking code, where the request includes various page information, section information, component information and/or other information described above. The tracking module 140 may then retrieve information from tracking data store 132 to determine identification information that represents each of the received values for tracking purposes. The information may be retrieved and/or determined by the tracking module, for example, based on key-value pairs, such that each of one or more keys provided to the tracking module in the code generation request includes an associated value in a table or other data structure stored in the tracking data store 132. In some embodiments, one or more of the values included in the tracking code may be determined by the tracking module 140 based at least in part by implementing a hash function based on values provided in the code request. In some embodiments, the various values to be included in the tracking code may be included in the generated code in an order specified in the request and/or determined based on one or more rules. The various values included in the code may be separated by one or more characters to indicate the starting and/or ending point of discrete values within the tracking code. For example, an underscore ("_") is used as a sample demarcation character in examples above, but any other character or symbol may be used, in other embodiments.

In some embodiments, one or more of the values included in the generated code may be retrieved from a data structure or field in tracking data store 132 that is frequently updated by business operators in order to edit, remove, add or otherwise alter the information that should be included in the generated code for a given selectable option. Accordingly, the tracking codes may be generated by the tracking module in a flexible manner that enables various individuals involved in the operation of the retail server 110 and/or tracking management server 120 to alter tracking code information associated with one or more selectable options within a page without the need to alter the code or content of the page itself. As an example, according to one embodiment, three different product managers responsible for different products or features associated with a single selectable option may each associate separate tags or other information to the given selectable option. The tracking code associated with the given selectable option on subsequently requested pages may then automatically include information associated with each of the three tags. According to aspects of the disclosure discussed below, each of the three product managers may then monitor performance of the given selectable option based on the respective tag added by the given product manager.

At block 508, for each item for which a tracking code was requested, the tracking module 140 appends the associated tracking code (generated at block 506) to a selectable uniform resource identifier or other identifier for the item within the page. For example, in one embodiment, the tracking module may add one or more characters to the end of the existing identifier to indicate the beginning of the tracking code portion of the identifier (such as, according to one embodiment, the characters "/ref="). The tracking module may then append the generated tracking code, including the one or more values determined at block 506, to the identifier. Once each identifier is altered to include the tracking code, the resulting identifier may be included in the page in association with a selectable option, such that the selectable option would cause a browser or other application presenting the page to request the given identifier (including the tracking code) upon user selection of the associated selectable option. In other embodiments, the tracking module 140 may associate the tracking code with the related selectable option and/or identifier in a manner other than appending the tracking code to the identifier. For example, the tracking code may be included in executable code associated with the page such that the executable code, when executed by the computing device 102 or other user device, causes the tracking code to be sent to the tracking management server 120 or other computing system based at least in part on a user selection of the associated selectable option. In some embodiments, the tracking code information may be sent via a POST request method supported by the Hypertext Transfer Protocol ("HTTP"), such that the user may not be able to see the tracking code within the request for the identifier. The remaining content of the page may be generated in various manners that are known in the art.

At block 510, the tracking module sends the generated page to computing device 102 for presentation to the user. After the user has been presented with the page, the tracking module may receive a request from the computing device 102 for an identifier (including the associated tracking code), which may be sent by the computing device 102 as a result of the user selecting the associated selectable option within the page. In other embodiments, the computing device 102 may locally store information regarding a tracking code associated with a selectable option selected by a user, then send one or more tracking codes (individually or in a batch) to the tracking management sever 120 at a later time. In response to receiving tracking code information, at block 512, the tracking module 140 may store the associated tracking code and optionally store additional metadata and/or other information associated with the selection for analysis, such as by storing data in tracking data store 132. For example, the tracking module 140 may maintain a log in tracking data store 132 indicating each time that an identifier (including any associated tracking code) is included in a page, each time an identifier is selected by a user and/or other information regarding user behavior, user selections, additions to a user's shopping cart or item list, purchases by a user and/or other information. Various actions or events associated with a single user may be linked or associated in the tracking data store 132 based in part on a cookie, account information, an Internet Protocol address and/or other methods known in the art. The item detail page or other content requested in the underlying identifier (e.g., the portion of the identifier prior to the tracking code) may be provided to the computing device 102 for display in response to the identifier request. The illustrative method 500 ends at block 514.

While FIG. 5 has been described above with reference to an embodiment in which tracking codes are generated by the tracking management server 120, in other embodiments, all or a portion of a tracking code may be generated by the computing device 102. For example, executable code included in a page or associated with a user interface may, when executed by the computing device 102, cause the computing device 102 to generate a tracking code associated with a selectable option. As an example, a script or other executable code may be included in a page sent by the retail server 110 to the computing device 102 for display by a browser or other application executed by the computing device 102. Upon a user selection of a given selectable option within the page, the script or other executable code may cause the computing device 102 to generate a tracking code that is sent to the tracking management server 120 or other computing system for tracking purposes. Accordingly, in some such embodiments, a tracking code is generated at the time a user selects a selectable option in a user interface, rather than at the time the user interface is initially generated.

FIG. 6 is an illustrative user interface 600 generated at least in part by the tracking management server 120 that includes tracking analytics information 604 associated with tracking codes generated by the tracking management server 120. The illustrative user interface 600 may be presented for display to a developer, an administrator, a businessperson or other user affiliated with the retail server 110 who is properly authorized to view such analytics data. The analytics information is presented using a first discovery attribution model, meaning that a given identifier and tracking code is counted as being responsible for a later conversion event (such as a shopping cart add or an item purchase) of a particular user if the given identifier was the first identifier associated with the item that was selected by the given user. The attribution model used for the presented analytics information 604 may be changed by selecting the change option 608. As illustrated, the administrator or other user viewing user interface 600 has entered analytics search criteria 602, which indicates that the user is interested in viewing tracking information associated with tracking codes that include the prefix "a_" (which may correspond, for example, to a specific store or subsection of the marketplace provided by system 100) and that are associated with the "projectX" feature or component. The relevant timespan is selected in search criteria 602 as the last seven days. The administrator or other user may have selected the refresh option 610 after entering the search criteria, such that the displayed analytics information 604 is responsive to the query provided in search criteria 602.

The tracking analytics information 604 may have been determined by the tracking module 140 based on information stored in tracking data store 112 associated with various users' selections of selectable options. As illustrated, the tracking analytics information 604 includes a list of the tracking codes (among those that match the search criteria 602) that were most often selected by users across various domains, which in the given example, are country domains. The information listed in tracking analytics information 604 for each tracking code includes total hits (e.g., the number of users that selected a selectable option associated with the tracking code), total shopping cart adds (e.g., the number of users that added an associated item to an electronic shopping cart subsequent to selecting a selectable option associated with the tracking code), purchased units (e.g., the number of users that purchased an associated item subsequent to selecting a selectable option associated with the tracking code), and percentage of site-wide shopping cart adds (e.g., the percentage of all shopping cart add events system-wide that are attributed to an identifier with the given tracking code).

The tracking information displayed in a user interface such as illustrative user interface 600 may vary depending on the embodiment and/or user preferences, such that additional or fewer fields may be included for each tracking code than are presented in tracking analytics information 604. For example, the tracking information, in some embodiments, may include various information associated with revenue generated based at least in part on user selections of the given selectable option, such as revenue generated from sales attributed to the selection. As another example, the tracking information may include a number or percentage of users that added the item to a shopping cart, wish list or other item list subsequent to selecting a selectable option associated with the tracking code. Furthermore, it will be appreciated that tracking information associated with tracking codes may be presented in a variety of ways other than those illustrated. For example, in some embodiments, the tracking module may generate a visual overlay in a user interface or page that indicates performance levels of one or more selectable options within the user interface, where the performance levels are determined by the tracking module based at least in part on stored tracking code information associated with the one or more selectable options. Performance or effectiveness of a given selectable option may be visually conveyed, for example, using a heat map, color coding, symbols and/or other methods.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
    an electronic data store configured to store tracking information associated with a plurality of identifiers; and
    a computing system comprising one or more computing devices, said computing system in communication with the electronic data store and configured to at least:
        receive, from a computing device of a user, a request for a page;
        in response to the request, determine a plurality of selectable options for inclusion in the page, wherein a different selectable option of the plurality of selectable options is selected for inclusion in each of two or more portions of the page, wherein each selectable option of the plurality of selectable options is associated with a different identifier to be requested by the computing device in response to user selection of the selectable option;
        for each selectable option of the plurality of selectable options:
            generate a tracking code associated with the selectable option, wherein the tracking code includes information identifying a portion of the page in which the selectable option is included; and
            append the tracking code to an identifier associated with the selectable option to form an appended identifier;
        send the page, including each of the plurality of selectable options, to the computing device for presentation to the user;
        receive an identifier request, from the computing device of the user, for an appended identifier associated with at least one of the plurality of selectable options included in the page, wherein the appended identifier includes an associated tracking code; and
        store tracking information in the electronic data store indicating that the user selected a selectable option associated with the associated tracking code.

2. The system of claim 1, wherein the appended identifier is a uniform resource identifier.

3. The system of claim 1, wherein each selectable option determined for inclusion presents information identifying an item in an electronic catalog.

4. The system of claim 1, wherein a first identifier is associated with a different tracking code when the first identifier is included in a first portion of the page than when the first identifier is included in a second portion of the page.

5. The system of claim 1, wherein two or more selectable options are included in each of the two or more portions of the page.

6. The system of claim 5, wherein the tracking code generated for each selectable option further includes information identifying a position of the selectable option within a portion of the page.

7. The system of claim 1, wherein the tracking code generated for each selectable option further includes information identifying a component of the computing system that selected the selectable option for inclusion in the page.

8. The system of claim 1, wherein the computing system is further configured to generate a visual overlay in association with display of the page, wherein the visual overlay indicates performance levels of one or more selectable options within the page, wherein the performance levels are determined based at least in part on tracking code information associated with the one or more selectable options.

9. The system of claim 1, wherein each tracking code is generated based at least in part on at least one of a country or a domain associated with the request.

10. A computer-implemented method comprising:
    as implemented by one or more computing devices configured with specific executable instructions,
        receiving, from a computing device of a user, a request for a page;
        in response to the request, determining a plurality of selectable options for inclusion in the page, wherein a different selectable option of the plurality of selectable options is selected for inclusion in each of two or more portions of the page, wherein each selectable option of the plurality of selectable options is associated with a different identifier to be requested by the computing device in response to user selection of the selectable option;
        for each selectable option of the plurality of selectable options:
            generating a tracking code associated with the selectable option wherein the tracking code includes information identifying a portion of the page in which the selectable option is included; and
            appending the tracking code to an identifier associated with the selectable option to form an appended identifier;
        sending the page, including each of the plurality of selectable options, to the computing device for presentation to the user;
        receiving an identifier request, from the computing device of the user, for an appended identifier associated with at least one of the plurality of selectable options included in the page, wherein the appended identifier includes an associated tracking code; and
        storing tracking information in an electronic data store indicating that the user selected a selectable option associated with the associated tracking code.

11. The computer-implemented method of claim 10, wherein the associated tracking code includes both (a) dynamically determined information, and (b) information automatically retrieved from one or more electronic data stores.

12. The computer-implemented method of claim 10, wherein the associated tracking code includes one or more tags previously selected to be included in tracking codes associated with a particular user interface feature.

13. The computer-implemented method of claim 10, further comprising storing tracking information in the electronic data store indicating a number of users that have selected a selectable option associated with the associated tracking code.

14. The computer-implemented method of claim 10, further comprising storing tracking information in the electronic data store indicating a number of users that have purchased a particular item subsequent to selecting a selectable option associated with the associated tracking code.

15. A computer-readable, non-transitory storage medium storing computer executable instructions that, when executed by one or more computing devices, configure the one or more computing devices to perform operations comprising:

receiving, from a computing device of a user, a request for a page;

in response to the request, determining a plurality of selectable options for inclusion in the page, wherein a different selectable option of the plurality of selectable options is selected for inclusion in each of two or more portions of the page, wherein each selectable option of the plurality of selectable options is associated with a different identifier to be requested by the computing device in response to user selection of the selectable option;

for each selectable option of the plurality of selectable options:

generating a tracking code associated with the selectable option wherein the tracking code includes information identifying in a portion of the page in which the selectable option is included; and appending the tracking code to an identifier associated with the selectable option to form an appended identifier;

sending the page, including each of the plurality of selectable options, to the computing device for presentation to the user;

receiving an identifier request, from the computing device of the user, for an appended identifier associated with at least one of the plurality of selectable options included in the page, wherein the appended identifier includes an associated tracking code; and storing tracking information in an electronic data store indicating that the user selected a selectable option associated with the associated tracking code.

16. The computer-readable, non-transitory storage medium of claim 15, wherein the computer executable instructions further configure the one or more computer devices to present analytics information regarding user behavior with respect to a plurality of tracking codes.

17. The computer-readable, non-transitory storage medium of claim 16, wherein the analytics information indicates a number of users that selected a selectable option associated with each of the plurality of tracking codes.

18. The computer-readable, non-transitory storage medium of claim 16, wherein the analytics information indicates a number of users that purchased an item subsequent to selecting a selectable option associated with each of the plurality of tracking codes.

19. The computer-readable, non-transitory storage medium of claim 16, wherein the analytics information identifies a user interface location that has most often resulted in user selection of a selectable option.

20. The computer-readable, non-transitory storage medium of claim 16, wherein the analytics information indicates revenue generated in association with a selectable option associated with each of the plurality of tracking codes.

* * * * *